April 11, 1950 R. ALKAN 2,504,062
ANGLE OF ATTACK INDICATOR
Filed Dec. 8, 1944 4 Sheets-Sheet 1
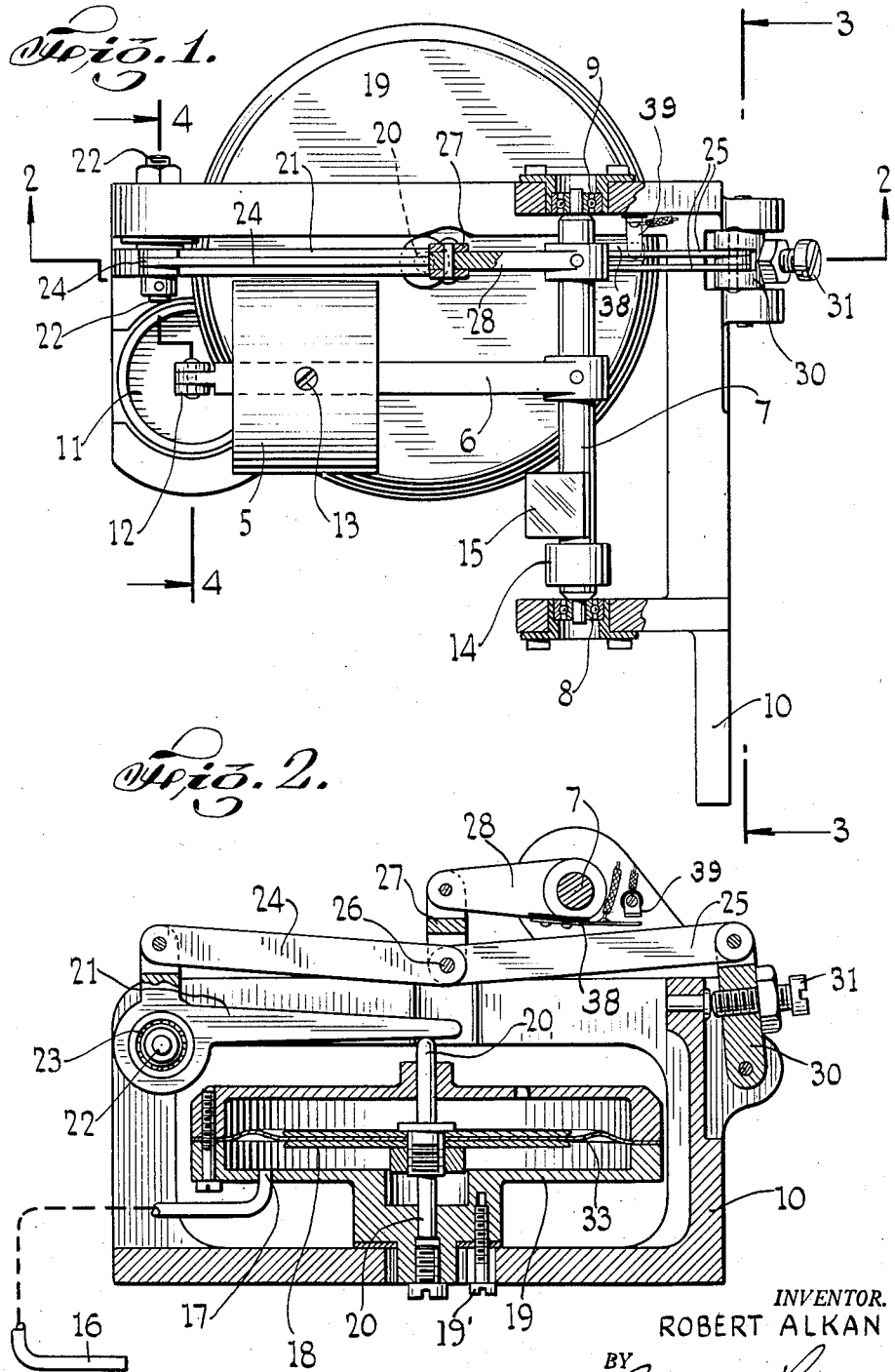
INVENTOR.
ROBERT ALKAN
BY Maurice Landen
ATTORNEY April 11, 1950          R. ALKAN          2,504,062
ANGLE OF ATTACK INDICATOR
Filed Dec. 8, 1944                    4 Sheets-Sheet 2

INVENTOR.
ROBERT ALKAN
BY
ATTORNEY

April 11, 1950   R. ALKAN   2,504,062
ANGLE OF ATTACK INDICATOR

Filed Dec. 8, 1944   4 Sheets-Sheet 3

INVENTOR.
ROBERT ALKAN
BY
Maurice Landere
ATTORNEY

April 11, 1950   R. ALKAN   2,504,062
ANGLE OF ATTACK INDICATOR
Filed Dec. 8, 1944   4 Sheets-Sheet 4
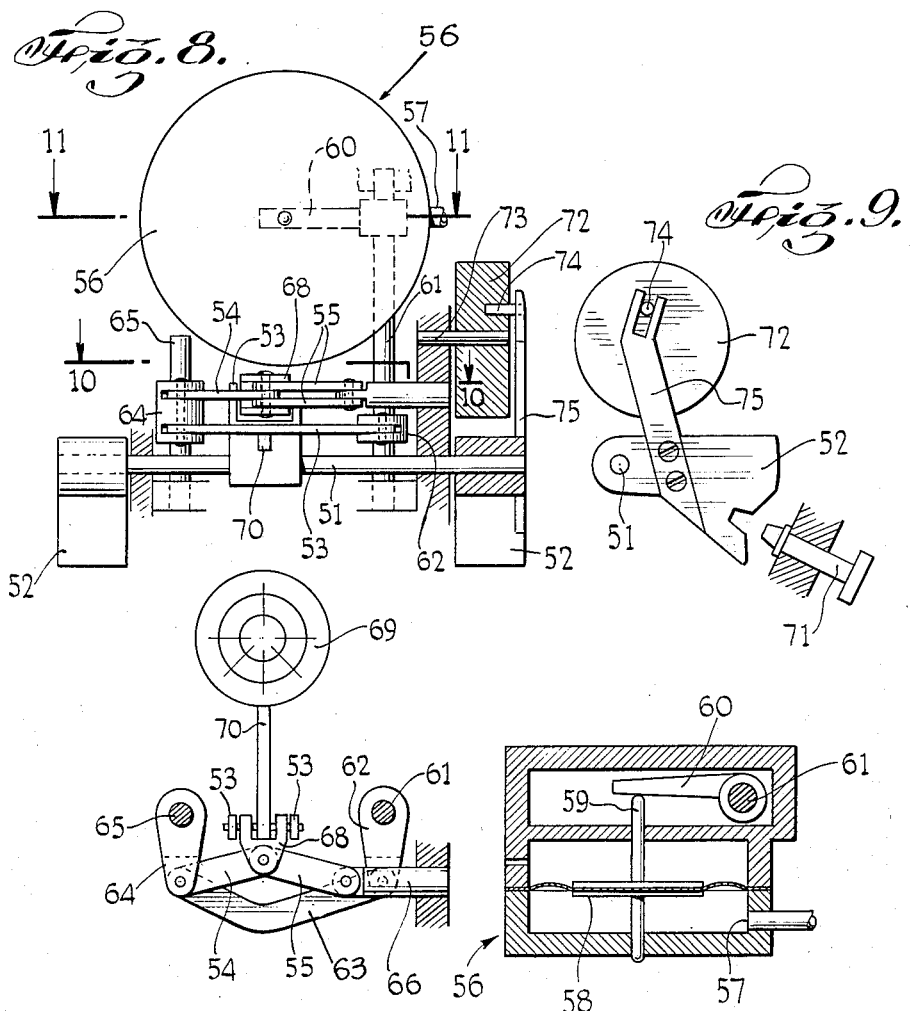
INVENTOR
ROBERT ALKAN
BY
*Maurice Lamarre*
ATTORNEY Patented Apr. 11, 1950

2,504,062

UNITED STATES PATENT OFFICE 2,504,062

ANGLE OF ATTACK INDICATOR

Robert Alkan, Locust Valley, N. Y., assignor to Specialties, Inc.

Application December 8, 1944, Serial No. 567,273

2 Claims. (Cl. 73—180)

The invention has been developed more particularly to provide an instrument for indicating the angle of attack of a dive bomber during the pull-out from the dive in order that the pilot may know the aspect of his airplane with reference to the line of flight and also in order that this information may be used in ascertaining the time for release of a bomb to hit the target.

In one method of dive bombing the pilot dives straight toward the target and starts his pull-out at a predetermined altitude. He releases the bomb during the pull-out. If the bomb were released during the dive straight toward the target before the pull-out it would fall short of the target but if it is released at just the proper instant during the pull-out it will be carried forward before release so that it will fall in a trajectory to reach the target.

It is a relatively simple matter to detect the angle between some reference line on the airplane such as the line of sight and a reference line in space as for example the true vertical or a line of dive previously established. A gyroscope may be used for this purpose.

It is therefore convenient in bomb control apparatus to arrange for release of the bomb when the plane has turned through a predetermined angle during the pull-out after the straight-line dive. However, the trajectory of the bomb will depend upon the direction of movement of the airplane at the moment of release and not on the aspect of the plane. For accurate bombing therefore it is necessary to make proper allowance for the difference between the angle of the airplane movement and the angle of aspect of the plane. This difference depends upon the angle of attack. The angle varies. Accordingly the present invention aims to provide in its preferred embodiment a mechanism for indicating moment by moment the angle of attack during the pull-out of the dive. The angle of attack during the pull-out is substantially proportional to the acceleration normal to the wing and substantially inversely proportional to the dynamic pressure in a forwardly directed Pitot tube or to the square of the air speed.

The principle of the instrument is based in part on the fact that the aerodynamic force normal to the wing, that is the lift, is substantially a linear function of the angle of attack within the speed range for which the instrument is devised.

The embodiment of the instrument herein illustrated comprises a momentum mass or weight moveable in response to the normal acceleration, that is to say the resultant of the centrifugal force and of the gravity component due to the curve of the pull-out together with an angle of attack indicator which is actuated by the weight in proportion to the normal acceleration. It comprises also a Pitot tube or other instrument for determining the air speed and means responsive to the Pitot tube pressure acting in opposition to the momentum mass. The arrangement is such that the response of the indicating element is in proportion to the centrifugal force and inversely proportional to the pressure in the Pitot tube or equivalent device.

The invention will be better understood from a consideration of a selected illustrative embodiment designed specifically for indicating the angle of attack during the pull-out from the dive, shown in the accompanying drawings in which:

Fig. 1 is a plan view of an instrument constructed in accordance with the principles of the invention.

Fig. 2 is a vertical sectional view taken on the lines 2—2 of Fig. 1.

Fig. 8 is a view in elevation of an embodiment of the invention designed to be built into or attached to the sight of a fighter airplane.

Fig. 9 is a side view of the weight and flywheel damper showing a locking device.

Fig. 10 is a horizontal sectional view taken on the line 10—10 of Fig. 8.

Fig. 11 is a horizontal sectional view of the air speed capsule taken on the line 11—11 of Fig. 8.

Figure 3:
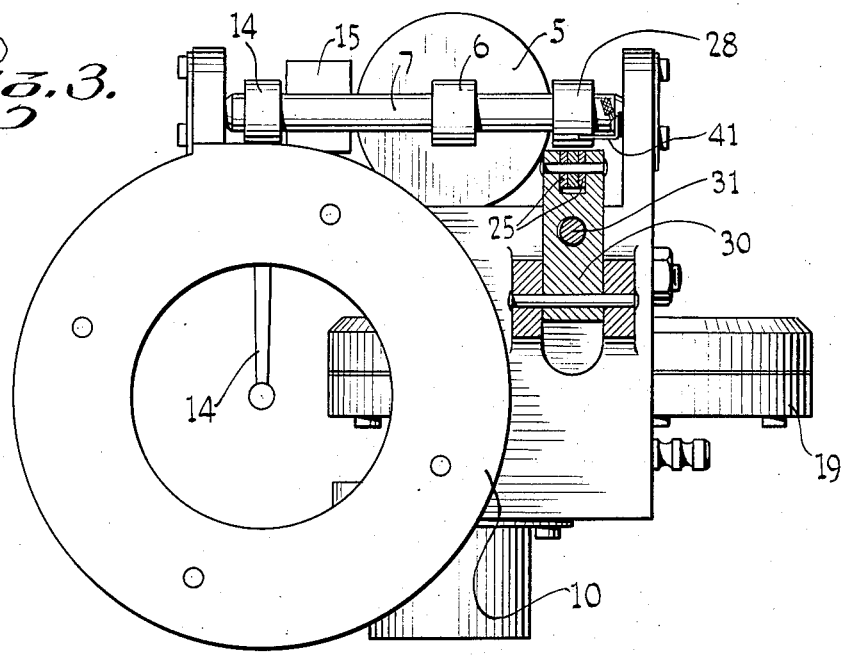
Fig. 3 is a vertical sectional view taken on the lines 3—3 of Fig. 1.
Figure 4:
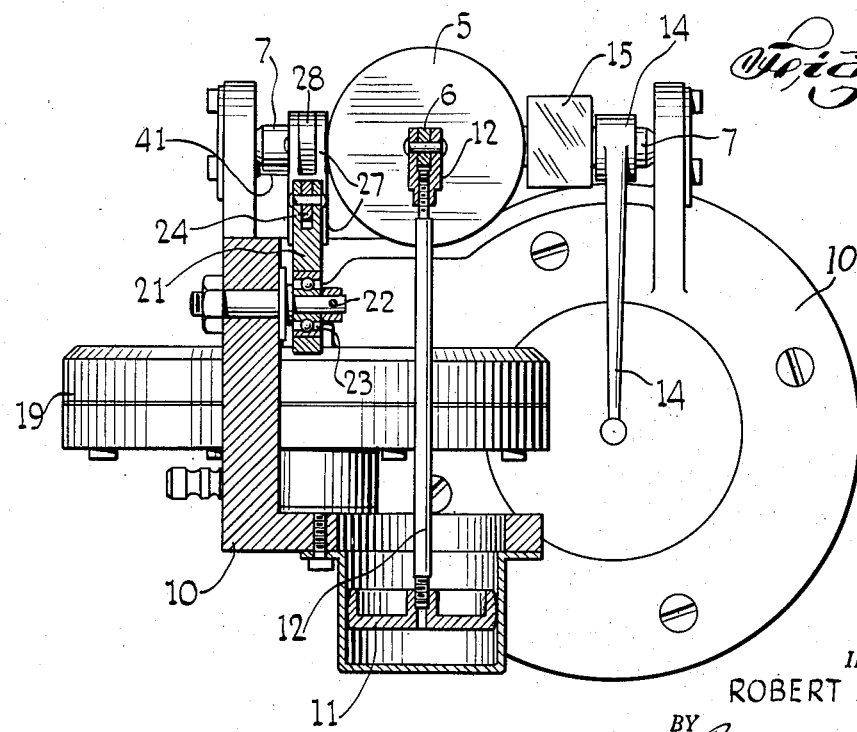
Fig. 4 is a vertical sectional view taken on the lines 4—4 of Fig. 1.

In the illustrative instrument shown in the drawing the momentum mass or weight 5 of the arrangement for measuring the acceleration normal to the wing is carried on an arm 6 rigidly secured to a rock shaft 7 mounted in miniature ball bearings 8 and 9 in the frame 10. The arm 6 is substantially parallel to the average line of flight of the plane and the weight 5 under the action of the acceleration normal to the wing during the pull-out moves downward, thereby rotating the rock shaft 7. Vibration and excessive rapid movement are inhibited by a dash pot 11 connected by a link 12 to the free end of the weight carrying arm 6. The weight is adjustable along the arm and is held in adjusted position by a set screw 13. A depending arm 14 secured to the rock shaft near the bearing 8 may serve as an indicator to indicate visually the angle of attack or it may serve as a point of attachment for control mechanism responsive to the instrument. A mirror 15 may be secured to the rock shaft at any desired position to reflect a beam of light onto a scale for more accurate indication of the angle.

The air speed has a considerable effect on the angle of attack and since accuracy is important it is preferable to make provision for applying the air speed factor. Since this factor has an opposite influence it may be applied to oppose movement of the weight as by tending to rotate the rock shaft in the opposite direction.

As shown, the dynamic air pressure from a forwardly directed Pitot tube 16 shown diagrammatically in Fig. 2 is admitted through an inlet 17 beneath the diaphragm 18 of a pneumatic capsule 19. A central plunger 20 secured to the diaphragm and movable through the top of the capsule actuates a bell crank lever 21 pivoted on the pin 22 secured in the frame 10 with a miniature ball bearing 23 to reduce friction. The upstanding arm of the bell crank lever is connected to apply tension to a linkage including two links 24 and 25 connected end to end by a pivot pin 26. Pressure is applied downwardly on the pivot pin 26 by a link 27 which in turn is actuated by an arm 28 on rock shaft 7. Downward pressure of the weight under the urge of acceleration will apply a corresponding pressure on the pivot pin 26. The tension applied to the links will, on the other hand, oppose movement by a force proportional to the dynamic air pressure. Adjustment of the linkage is provided at the outer end of the link 25. As shown, this link is pivoted to a lever 30 hinged at its lower end to the frame 10 and adjustable by means of the set screw 31 to permit more or less sag of the links from a straight line. The capsule 19 is adjustable in a slot in frame 10 to vary the effective length of lever 21 and is held in adjusted position by one or more screws 19'.

The pneumatic capsule includes a central diaphragm sheet 33 of oiled silk with two stiffening plates on opposite faces of the silk to form in effect a piston of predetermined area responsive to the pressure and transmitting that pressure to the central plunger 20.

Figure 5:
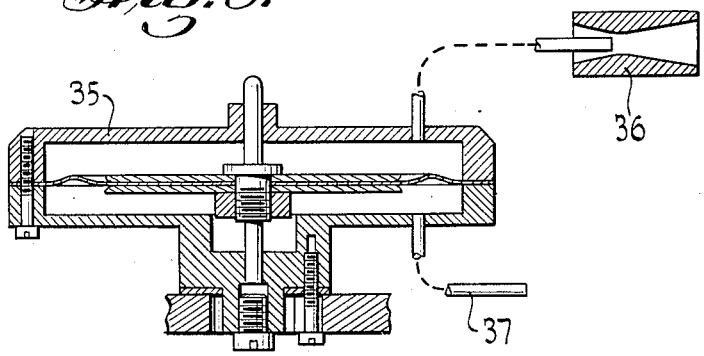
Fig. 5 is a vertical sectional view, partly diagrammatic, of an alternative arrangement of pneumatic capsule and connections.

The arrangement shown for compensating for air speed is arranged to be energized only by dynamic pressure as above indicated. Obviously other devices may be employed. If a pneumatic capsule is used it can be actuated by pressure on one side or by suction on the other side or by both jointly. In Fig. 5 is shown diagrammatically a capsule 35 in which suction from a Venturi tube 36 is applied on one side and pressure from a Pitot tube 37 is applied on the other side. If the pneumatic capsule of Fig. 5 is used in place of that shown in Fig. 2, obviously other corresponding adaptations will be necessary.

It is desirable that a warning signal be provided in order that the pilot may be cautioned when the angle of attack dangerously approaches the stalling angle. For this purpose a pair of electrical contacts 38, 39 is provided, one carried by the rock shaft 7 and one adjustably carried by the frame 10.

It will be clear that the linkage with the connections to the weight 5 and the pneumatic capsule shown provides a convenient arrangement for applying pressure substantially proportional to the acceleration normal to the wing and substantially inversely proportional to dynamic pressure of the air, or to the square of the air speed.

It can be shown mathematically that if the mechanism is suitably designed it will operate within the practical working range of angle of attack with almost mathematical precision. Even the error which occurs as the result of approximation and compromises, can be compensated by the application of known expedients.

Figure 6:
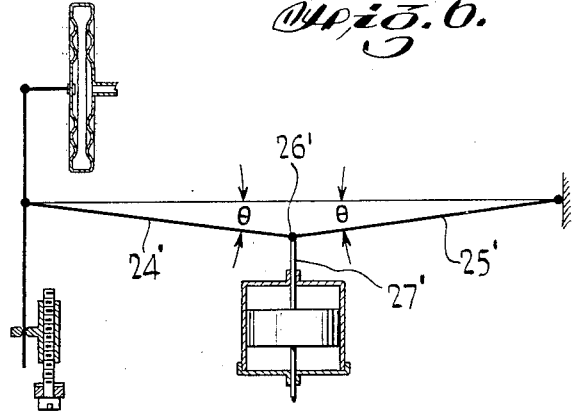
Fig. 6 is a diagrammatic view indicating certain stresses.

The principles involved will be better understood by reference to the diagram Fig. 6, which represents the linkage and the forces applied. Each of the links 24', 25', forms an angle $\theta$ with the horizontal, which angle is substantially proportional to the angle of attack. The constants of the apparatus, that is to say the lengths of arms, links and levers, the effective area of the diaphragm and the weight of the momentum mass are so calculated that the force applied as tension on the links is proportional to the dynamic pressure due to air speed and the force acting downwardly on the link 27' and therefore on the pivot 26' is proportional to the force of acceleration normal to the wing.

When the linkage is in equilibrium the forces of tension in the links 24', 25' and of thrust in the link 27' obviously bear a certain mathematical relation to each other.

The principle underlying the design of the instrument depends upon the fact that the aerodynamic force normal to the wing (the lift) is practically a linear function of the angle of attack in the normal speed range of airplanes. The normal force is equal to the product of the mass of the airplane and the normal acceleration. We may then write the equation for this force as $$\frac{W}{g}a = \frac{1}{2}\rho V^2 \alpha \frac{dC_L}{d\alpha} S$$

wherein W is the weight of the airplane, $a$ is the acceleration normal to the wing, $g$ is gravity, $\rho$ is air density, V is air speed, $\alpha$ is angle of attack, $C_L$ is coefficient of lift and S is the wing area. Now $$\frac{1}{2}\rho V^2 = q$$

the dynamic pressure, $$\frac{dC_L}{d\alpha}$$

is the slope of the linear portion of the lift curve of the particular airplane. In other words the normal force is equal to the product of the dynamic pressure, the angle of attack and a constant. From the equation above the angle of attack is $$\alpha = \frac{W}{S} \cdot \frac{a/g}{q} \cdot \frac{1}{\frac{dC_L}{d\alpha}}$$

In this equation W, S and $$\frac{dC_L}{d\alpha}$$

are constants for the particular airplane and are represented in the proportions of the mechanism. Therefore we have the equation Angle of attack equals a constant times $\dfrac{a}{q}$ Referring now to the diagram we note that the vertical force $$\frac{W}{g}a$$

multiplied by a constant is applied transverse to the tension links with very little error due to the mechanism. The dynamic force $q$ multiplied by a constant is applied as tension to links with only a minor error due to the mechanical arrangement. As the angle of link position varies with the angle of attack represented by $\theta$ within the practical operating conditions, the error introduced will be negligible.

Other illustrative embodiments of the invention are shown somewhat diagrammatically in Figs. 7 to 11 inclusive.

Figure 7:
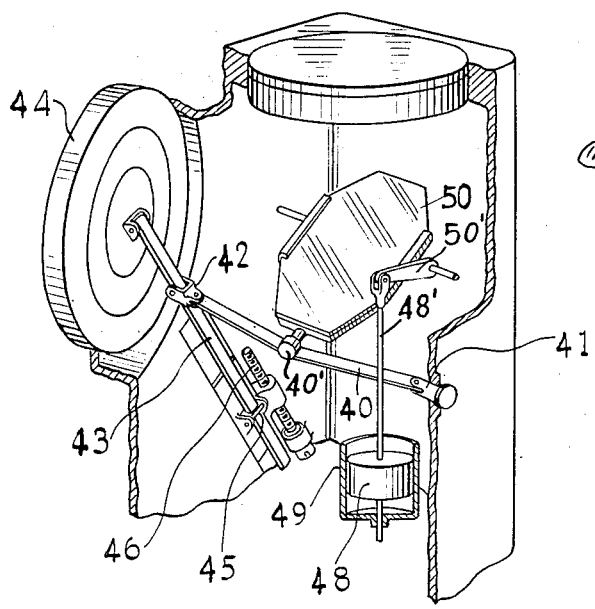
Fig. 7 is a perspective view showing a ribbon substituted for the two principal tension links and connected directly to an adjustable mirror.

Fig. 7 shows diagrammatically an arrangement in which the links are replaced by a ribbon 40 or other tension member connected at a fixed point 41 and to a point 42 on a lever 43. A pneumatic capsule 44 arranged to receive dynamic air pressure varying with the speed of flight applies pressure to one end of the lever 43 to apply tension to the ribbon 40. At its other end the lever 43 is fulcrummed on an adjustable pivot member 45 adjustable by a screw 46 to vary the effective length of the lever. This permits an adjustment that is sometimes desirable when setting up the instrument. A weight 48 responds to acceleration normal to the wing. The weight is connected to the mirror by rod 48' and arm 50' rigidly secured to the rock shaft which carries the mirror. The mirror in turn has a projection 40' bearing on the ribbon 40. The force of the weight thus opposes pressure of the capsule. In order to dampen the movement of the weight it is mounted in a dash pot casing 49. In this arrangement the mirror 50, forming part of a computer, is directly connected to the mechanism to be moved angularly.

In Figs. 8 to 11 are shown the principal parts of an embodiment designed to be built into a military sight and to be directly connected to actuate the reticule to compensate for variation of the acceleration normal to the wing of the airplane. A rock shaft 51 carries a pair of momentum weights 52 at its opposite ends and is connected by an arm 53 at its center to a pair of links 54, 55 which in turn are held under tension longitudinally by the force of an air pressure capsule 56 in the same manner, in principle, as in the other embodiments. The air capsule receives dynamic air pressure at an inlet 57 from a suitably arranged Pitot tube applying pressure to the diaphragm 58 which through a plunger 59 presses against a lever arm 60 secured to a rock shaft 61. A second arm 62 secured to the rock shaft 61 is connected by a compression link 63 to a similar arm 64 on the shaft 65 to which arm also is connected the tension link 54. The force of dynamic air pressure in the capsule is transmitted through this system to apply tension to the links 54 and 55, the arm 55 being pivoted to a bracket 66 fixed in the casing. The connections between the forked lever arm 53 and the pivotal connection of the two links 54 and 55 comprises as the principal element a forked link or clevis 68. The reticule 69 indicated diagrammatically is suitably connected by link 70 to the arm 53 to be moved under direct control of the mechanism. The exact arrangement will depend upon the mathematical requirements of a particular installation.

A locking pin 71 is provided for engagement with one of the momentum weights 52 to lock the mechanism in a predetermined fixed position. Vibration of the mechanism and therefore of the reticule 69 controlled thereby is damped by a rotatable fly wheel or damping mass 72. This mass of substantial weight as compared with the weight of the two momentum weights is freely rotatable on a stud 73 fixed in the casing or frame of the instrument. A pin 74 fixed in the mass 72 is engaged in the fork of an arm 75 rigidly secured to one of the weights 52 to be moved upon movement of the momentum weights and in turn to damp the movement of the momentum weights.

The foregoing particular description of selected embodiments is illustrative merely and is not intended as defining the limits of the invention. Variations in the construction and application may be made without departing from the spirit of the invention.

I claim:

1. An instrument for indicating the angle of attack of an airplane wing comprising a dynamic air pressure tube, a pneumatic capsule arranged to receive air pressure from said tube, a pair of toggle links, a lever connecting said pneumatic capsule to said links to apply tension thereto, a rock shaft, an arm connected to said rock shaft, a weight responsive to acceleration normal to the wing secured to said arm, a second arm secured to said rock shaft and connected to apply force transverse to the said links and an angle indicator actuated by said rock shaft substantially as described.

2. In an instrument for indicating the angle of attack of an airplane wing, the combination with a frame of a pneumatic capsule arranged to receive dynamic air pressure, a tension toggle linkage, an adjustable mounting on said frame to which one end of the toggle linkage is connected, a bell crank lever pivoted in said frame and actuated by the pneumatic capsule to apply tension to said linkage at its other end, a rock shaft, an arm secured thereto and a weight carried by said arm to be actuated by acceleration, and a second arm secured to said rock shaft and connected to said toggle linkage to apply pressure transversely thereof.

ROBERT ALKAN.

REFERENCES CITED

The following references are of record in the file of this patent:

UNITED STATES PATENTS

| Number | Name | Date |
| --- | --- | --- |
| 1,885,578 | Boykow | Nov. 1, 1932 |
| 2,139,694 | Reid et al. | Dec. 13, 1938 |
| 2,176,807 | Wunsch | Oct. 17, 1939 |
| 2,182,706 | Shanley | Dec. 5, 1939 |
| 2,277,625 | Baynes | Mar. 24, 1942 |
| 2,352,955 | Johnson | July 4, 1944 |